Aug. 16, 1927.
R. C. BENNER ET AL
1,639,280
STORAGE CELL AND ELECTRODE THEREFOR
Filed Aug. 11, 1922  2 Sheets-Sheet 1
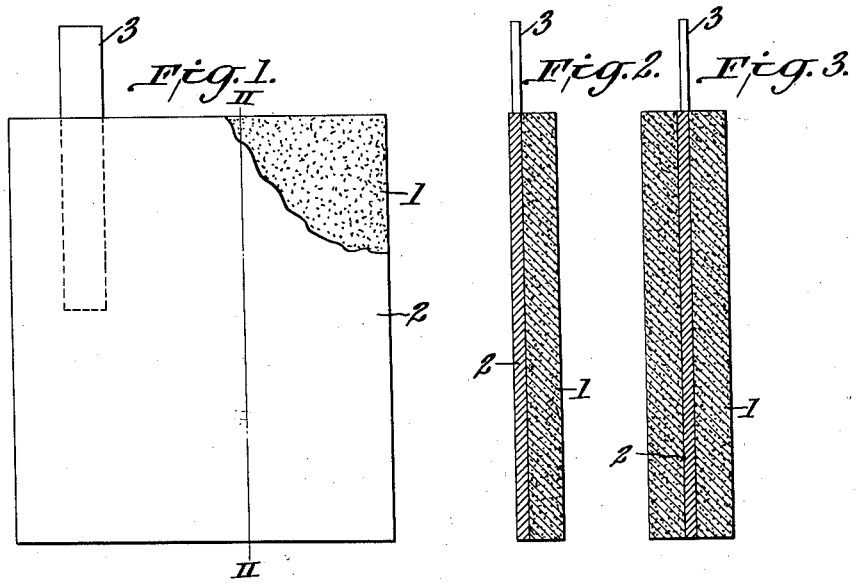
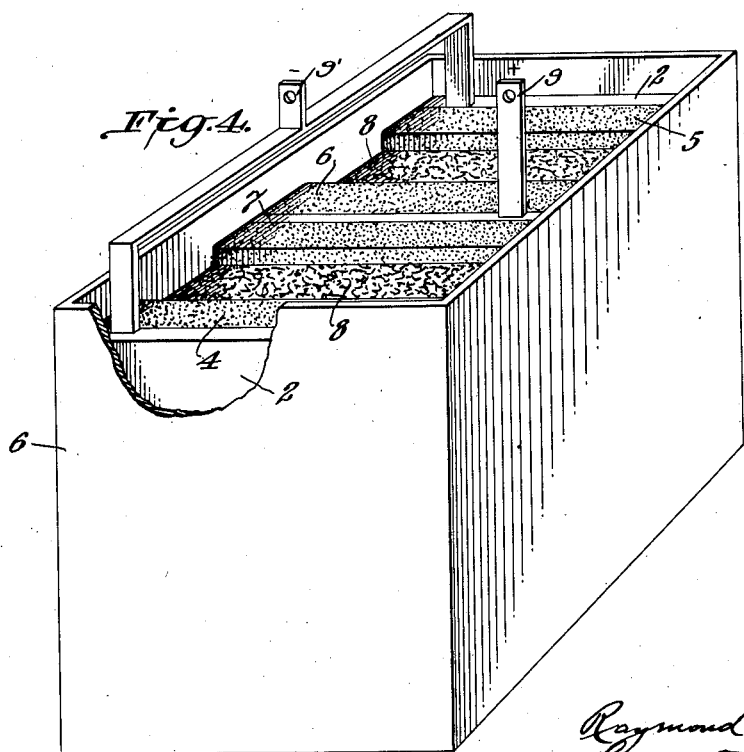

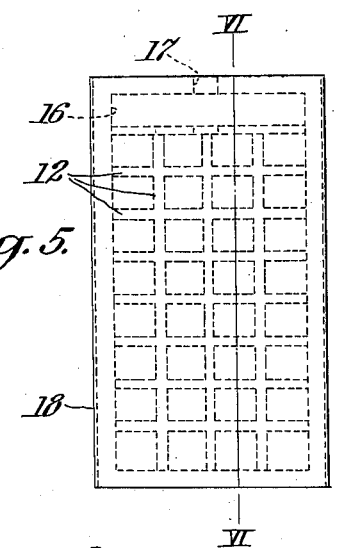
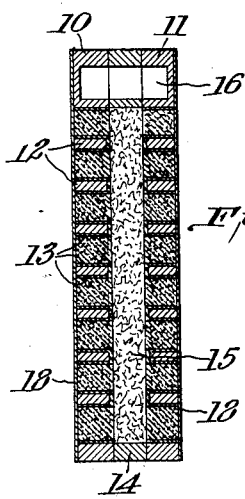
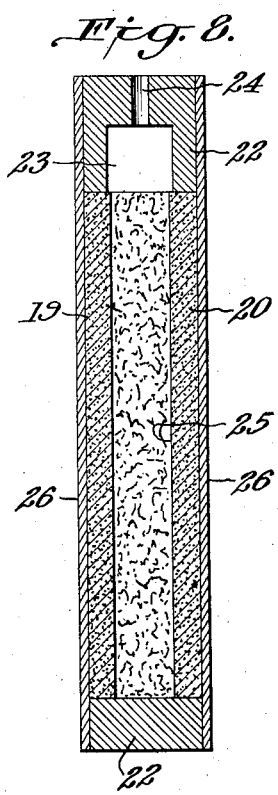
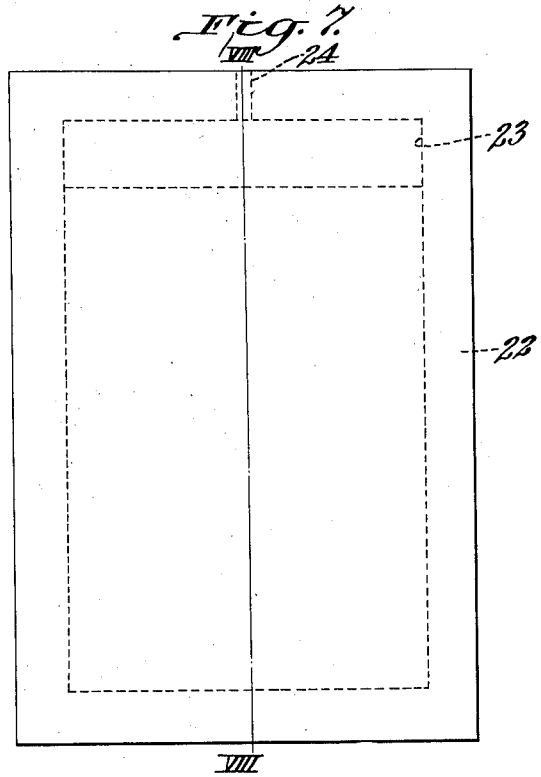

Patented Aug. 16, 1927.

1,639,280

UNITED STATES PATENT OFFICE.

RAYMOND C. BENNER, OF BAYSIDE, AND HARRY F. FRENCH, OF FLUSHING, NEW YORK, ASSIGNORS TO THE PREST-O-LITE COMPANY, INC., A CORPORATION OF NEW YORK.

STORAGE CELL AND ELECTRODE THEREFOR.

Application filed August 11, 1922. Serial No. 581,203.

This invention relates to storage cells and storage cell electrodes. A particular object of the invention is to provide an efficient, light weight construction in which a thin metallic coating upon the active material performs all the essential functions of the usual lead grid and in certain cases also makes it possible to dispense with the battery container ordinarily required.

Storage batteries comprising lead grids assembled in a casing are relatively heavy and are objectionable on this account for certain uses, for example in portable electric lighting devices. By the present invention the weight of the battery is materially reduced, without sacrificing any substantial advantages, by substituting for lead grids a coating of metal deposited upon the active material. In the preferred form of the invention we further reduce the weight and simplify the construction of the battery by utilizing slabs of active material, exteriorly coated with metal, for the walls of the battery container.

The invention will be described in connection with the accompanying drawings, illustrating preferred embodiments. In the drawings, Fig. 1 is a front elevation, partly broken away, of an electrode comprising a slab of active material coated with metal;

Fig. 2 is a vertical section on line II—II, Fig. 1;

Fig. 3 is a vertical section through a slab in which both faces are active;

Fig. 4 is a perspective view of a battery in which a plurality of metal coated electrodes are assembled;

Fig. 5 is a front elevation of a storage cell in which metal coated active material forms the greater portion of the container walls;

Fig. 6 is a vertical section on line VI—VI, Fig. 5;

Fig. 7 is a front elevation of a modified form of cell; and

Fig. 8 is a vertical section on line VIII—VIII, Fig. 7.

Referring to Figs. 1 and 2, reference numeral 1 denotes a body of active material or material to be rendered active, shown as in slab form. This is illustrative only, as the active material may have any other desired shape. A coating 2 of metal, which will usually be lead or a suitable lead-antimony alloy, is deposited upon one face of the slab 1. The metal coating gives ample conductivity and strength without largely increasing the weight of the active material.

We prefer to apply the metal by spraying it in molten condition upon the active material. This may be done by the well-known Schoop process or in any other manner giving equivalent results. The bodies of active material are preferably carried by a conveyor and interposed for a proper interval in the path of the metal spray. The simplicity of this procedure makes it well adapted for large scale production of battery plates.

A metal-sprayed body, such as that shown in Fig. 2, may have its metallic surface covered with a layer of active material, forming a double electrode of the type shown in Fig. 3. Strips 3 of lead or other suitable conductors are preferably placed upon the active material before spraying and are cemented in the desired position by the sprayed metal. Other forms of connectors may of course be supplied.

When active material in slab form is used, it will usually be assembled as shown in Fig. 4. The metal-coated slabs have adequate strength for use in such an assembly and do not become distorted or disintegrated to an objectionable extent on charge of discharge. In Fig. 4, the slabs 4 and 5 adjacent the ends of the casing 6', consist of negative active material provided with an exterior metallic coating 2. A positive electrode 6, having an embedded metal layer 7, is disposed between the negative electrodes and is separated from them by pulpboard 8 or other suitable absorptive, nonconductive material. Current may be taken from the battery through connectors 9 and 9' in electrical connection with the positive and negative electrodes, respectively. The separators 8 are preferably of such thickness and absorptive capacity that they may contain an adequate amount of electrolyte when the battery elements are closely fitted in the casing 6'.

In the form of the invention shown in Figs. 5 and 6, similar rectangular frames 10 and 11 are formed from suitable non-conducting, acid resisting material of light weight, for example celluloid. These frames are provided with any desired means for receiving and holding active material. A lattice construction 12 has been shown by way of illustration. The lattice is preferably coated with lead or lead alloy 13, by spraying or in any other convenient manner. Active materials are pasted upon the frames and the electrodes so prepared may be formed as usual. A frame 14, adapted to carry a body of electrolyte absorbent 15, is received between frames 10 and 11, and the three frames are secured together by cementing or equivalent means. The absorbent may be of any suitable kind, but is preferably a composition of glass wool and wood pulp, such as described in the application of Raymond C. Benner, Serial No. 552,834, filed April 15, 1922. An air space 16 adjacent the top of the cell is open to the atmosphere through vent 17.

The exterior faces of the active material and of supporting frames 10 and 11 are covered with a metallic coating 18. This serves the double purpose of providing a conductive path through which the current may pass from the active materials, and of preventing the passage of electrolyte past their exterior surfaces. It will be noted that no separate casing for the cell is required, as the metallic coating of the active material serves the purpose of the casing walls.

Figs. 7 and 8 illustrate a modified form of the invention shown in Figs. 5 and 6. The active materials are molded into slabs 19 and 20 of the proper size, and are secured in the rectangular frame 22 by cementing or in any other suitable manner. The top of the frame is cut away to form the air chamber 23, and a vent 24 is provided. Electrolyte, preferably carried by an absorbent, is provided in the chamber 25 between the active material slabs 19 and 20. The assembled cell is then sprayed with lead, forming the impervious conductive coating 26.

Cells of the types illustrated in Figs. 5 to 8 are adapted to be connected in series merely by being placed in proper contact, as the exterior metal coating on each face of the cells is in electrical connection with either the positive or the negative active material. Conductors to facilitate other methods of connection may of course be provided.

While we regard spraying as the preferred method for applying the metallic coating to the active materials, the use of other methods which will give comparable results is not precluded. Our invention in its broadest aspect consists in the application of such coating and is adapted for use in a variety of constructions other than those specifically described herein.

We claim:

1. Process of making storage batteries, comprising shaping bodies of active material, fitting said bodies in spaced relation into a frame to close the lateral openings therein, applying a metal to the exterior surfaces of the bodies to form a conductive coating impermeable by liquid, and placing electrolyte in the space between the bodies.

2. A storage cell comprising opposed bodies of active material, electrolyte therebetween, and an adherent metallic coating, impervious to liquid, upon the exterior faces of the active material bodies.

3. A storage cell comprising a frame of insulating material, bodies of active material fitted into said frame to close the lateral openings therein, said bodies defining a central space adapted to receive electrolyte, and an adherent metallic coating upon the exterior faces of the bodies and preventing passage of liquid therethrough.

4. In a storage cell, electrode elements comprising apertured supports carrying active material, electrolyte therebetween, and an adherent metallic coating, impervious to liquid, upon the exterior faces of said elements.

In testimony whereof, we affix our signatures.

RAYMOND C. BENNER.
HARRY F. FRENCH.